US007875346B2

(12) United States Patent
Hofmann et al.

(10) Patent No.: US 7,875,346 B2
(45) Date of Patent: *Jan. 25, 2011

(54) BOARD CONSISTING OF A DERIVED TIMBER PRODUCT AND METHOD FOR THE PRODUCTION THEREOF

(75) Inventors: Michael Hofmann, Buxtehude (DE); Andreas Holm, Apensen (DE); Dirk Venschott, Hamburg (DE)

(73) Assignee: CVP Clean Value Plastics GmbH, Buxtehude (DE)

( * ) Notice: Subject to any disclaimer, the term of this patent is extended or adjusted under 35 U.S.C. 154(b) by 1323 days.

This patent is subject to a terminal disclaimer.

(21) Appl. No.: 10/559,893

(22) PCT Filed: Jun. 3, 2004

(86) PCT No.: PCT/EP2004/006013

§ 371 (c)(1), (2), (4) Date: Dec. 6, 2005

(87) PCT Pub. No.: WO2004/108374

PCT Pub. Date: Dec. 16, 2004

(65) Prior Publication Data

US 2006/0121261 A1 Jun. 8, 2006

(30) Foreign Application Priority Data

Jun. 6, 2003 (DE) ................................ 103 26 181

(51) Int. Cl.

| | |
|---|---|
| ***B32B 5/16*** | (2006.01) |
| ***B32B 21/06*** | (2006.01) |
| ***B32B 23/04*** | (2006.01) |
| ***B32B 21/04*** | (2006.01) |

(52) U.S. Cl. ....................... 428/323; 428/535; 428/536; 428/537.1

(58) Field of Classification Search ................. 428/528, 428/535, 536, 537.1

See application file for complete search history.

(56) References Cited

U.S. PATENT DOCUMENTS

| | | | | |
|---|---|---|---|---|
| 3,150,834 A * | 9/1964 | Doyle et al. | .................. | 241/15 |
| 5,154,361 A * | 10/1992 | Willoughby | ................. | 241/16 |
| 5,435,954 A | 7/1995 | Wold | .......................... | 264/115 |
| 5,662,994 A | 9/1997 | Funger et al. | ............... | 442/413 |
| 5,786,279 A | 7/1998 | Funger et al. | ............... | 442/659 |

FOREIGN PATENT DOCUMENTS

| | | | |
|---|---|---|---|
| DE | 42 08 259 | A1 | 9/1993 |
| DE | 101 51 368 | A1 | 5/2003 |
| EP | 0 082 295 | | 11/1982 |
| EP | 0082295 | A2 * | 6/1983 |
| EP | 0 750 077 | A1 | 3/1996 |
| JP | 58-110243 | | 6/1983 |
| JP | 7-290457 | | 11/1995 |
| JP | 2001-088126 | | 4/2001 |
| JP | 2001-96516 | | 4/2001 |
| JP | 2003-19707 | | 1/2003 |
| WO | 99/42265 | | 8/1999 |

* cited by examiner

*Primary Examiner*—Sheeba Ahmed
(74) *Attorney, Agent, or Firm*—Vidas, Arrett & Steinkraus

(57) ABSTRACT

A plate of wood material, wherein wood fibers or wood flakes and synthetic particles or fibers, respectively, are compressed to a plate by a heat compression process, a portion of the wood flakes or fibers is substituted by a milled or fibrillated agglomerate of mixed synthetics of waste material from waste removal and the particle size of wood flakes or fibers on one side and of the milled agglomerate on the other side, is approximately equal.

10 Claims, No Drawings

BOARD CONSISTING OF A DERIVED TIMBER PRODUCT AND METHOD FOR THE PRODUCTION THEREOF

CROSS-REFERENCE TO RELATED APPLICATIONS

Not Applicable

STATEMENT REGARDING FEDERALLY SPONSORED RESEARCH

Not Applicable

BACKGROUND OF THE INVENTION

With respect to plates or boards of wood material it is differentiated besides other wood material between wood chip or wood flake and wood fibre plates. Wood fibre plates are made of fibrillated wood, with the manufacturing carried out in a wet process or in a dry process in a liquid or gaseous medium depending upon the formation of the non-woven fibre formation. The fibrillating of pre-disintegrated wood (cleaved chips) takes place in a disc refiner after hydrothermic preparation. The fibre material is added by a synthetic bonding agent in the dry process. In the wet process the wood fibre panels can a made under use of the inherent bonding properties of the fibre material without additional bonding means, the clogging of the fibres being of importance insofar. After making the non-woven formation of fibres the wood fibre plates are compressed by use of heat and pressure. Wood fibre plates are coated to a large extent e.g. with melamine resin films, sheets or varnish. They are used in manufacture of furniture and inside decoration but also within doors, for packaging purposes, in construction etc. Porous wood fibre plates are used for heat and acoustic damping purposes.

In case of wood chip plates the wood chips or flakes similar to the wood fibre plates are compressed under heat with a binding agent of synthetic resin glue (e.g.: urea or melamine-formaldehyde-resin). The sizes, the shape and the arrangement of chips or flakes and the amount of the synthetic resin content may vary the properties of the wood chip plates. High value plates are manufactured with a plurality of layers and have particularly fine cover flakes. For the use in furniture industry the wood chip plates can be coated with decorative films, ground films or veneers.

It is an object of the invention to provide a wood material plate wherein the wood chips or flakes or wood fibres are partially substituted, with the provision of the materials for the plate causing low costs without affecting the properties of the wood material plates.

BRIEF SUMMARY OF THE INVENTION

In the wood material plate according to the invention a portion of the wood flakes or wood fibres is substituted by milled or fibrillated agglomerate of a mixed plastic material of waste removal. The content of milled or fibrillated agglomerate can amount up to 150 weight % referring to 100 weight % masses of wood chips or wood fibres atro. The content even could be above 150 weight % referred to 100 weight % wood chips or wood fibre mass atro. According to an embodiment of the invention, the particle sizes of the wood chips or wood fibres on one side and of the milled agglomerate on the other side are approximately equal. The sizes of the wood chips or flakes or wood fibres are preferably between 00.5 and 2.0 mm. The size of the particles of the milled agglomerate is preferably smaller than 1.0 mm.

In the present collecting systems the waste plastics e.g. packaging material from private households, e.g. yoghurt cups, sheets for packages, protection wrapper, shopping bags, bottles for cleaning agents, toothpaste tubes etc. predominantly include mixed plastics. They may include besides the usual sheets and plastics of LDPE, HDPE or PP also remainder of sheets of polyamides, polycarbonates, PET or other plastics and thus are not of one class or fraction of plastics. The quantitative distribution of the different plastic classes or fractions as known is carried out by a processing and sorting operation by a collecting company and depends upon the following parameter: Collection behaviour and quality consciousness of the population in the region may be quite variable. The above refers in particular to collection systems for household waste.

For the time being, various techniques for the sorting of collected plastics are available. The following examples are mentioned: Classifier, swim-sunk classifying (buoyancy in water at specific density<1), qualitative identification of plastics by different infrared spectrograms, also in combination with classifying by other methods. Despite of the mentioned techniques, a classifying of plastics into genuine or one-fraction plastics which usually are not collected along with respect to their class cannot be carried out economically. LDPE-sheets or films can be separated from HDPG-sheets with shares of approximately 95%. If, however, combined sheets or films are collected e.g. polyamide films coated with LDPE or HDPE-films a classifying into genuine classes is nearly impossible.

The product of collecting and classifying endeavours of mixed plastics thus will be still mixed plastics. In particular under economic aspects it must be considered that with an improvement of the classifying endeavours the costs for sorting and processing must be significantly below the costs for the supply of new one-fraction material. These mixed plastics beside polyethylene, polypropylene include also polyamide, polycarbonate and PET contents. The occurence of remainder of aluminium or mineral portions e.g. silicone compounds cannot be excluded.

A usual processing of the mentioned mixed plastics is the so-called agglomerating. Disintegrated sheets are heated by friction by stirring in a stirrer so that the disintegrated particles begin to melt and become fused. Cold water is sprayed onto the heated agglomerate in intervals so that a portion of organic contents escapes with the water vapor. Contemporarily, the melted sheets cool down and agglomerate to flowable granular structures. The typical product of transportable classified fraction of mixed plastics, predominantly sheet remainder, thus is the agglomerate. Agglomerates of mixed plastics have normally a bulk density of 320 kg/m$^3$ and can be well-transported.

The central problem with mixed plastics is that a material 1:1 utilisation is impossible contrary to glass, PVC, paper, tin-plate, aluminium or the like. Typical techniques for plastics—as the extrusion, injection moulding or calendering or the like—cannot be used since this requires a processable molten mass.

Mixed plastics consist mainly (more than 50%) of rests of sheets or films but include also remainder of plastic shaped parts as disintegrated particles of yoghurt cups, bottle covers or thick-walled bottles e.g. for cleaning liquids. Mixed plastics therefore have no defined melting point rather a melting temperature range of very large extent. There are mixed plastics having materials which in a melting window as usual for conventional processes as extrusion or calendering until 200° C. do not melt e.g. aluminium or PET remainder. The viscosity of the mixed plastics is different and depends on the composition of the plastics. Even at high temperatures a sluggish mass is achieved which does not become less viscous with increasing temperature. Specific plastics as LDPE (melting point approximately 105-115° C.) disintegrate at temperature ranges into carbon under emitting carbon dioxide and water vapor while polyamides begin to melt (melting point from 180° C.). By the disintegration of low melting polyolefins as LDPE at higher temperatures an irreversible mix is formed with a high content of carbon. A grey or black mass is achieved which after cooling has properties which are different from those prior to melting because the mass is chemical or physical.

In the wood material plate according to the invention only a portion of the wood flakes or fibres is substituted by mixed plastics in that the agglomerate from the waste removal is milled or fibrillated and added to the wood flakes or wood fibres prior to compression. Mixed plastics are resistant against humidity and resemble wood chips or flakes or wood fibres with respect to their temperature stability. By the addition of milled or ground mixed plastics, the wood material plates do not show significant improvements with respect to the material properties. On the other side the substitution of wood flakes or fibres do not deteriorate the material plate. By the use of ground or milled mixed plastics the expenses for the manufacture of wood material plates are drastically reduced. Furthermore, the advantage is achieved that the mixed plastics are used and recycled and must not be deposited or burnt.

According to an embodiment of the invention a portion of milled or ground agglomerate of low melting one-fraction plastics from waste removal is added. Agglomerate of one-fraction plastics e.g. genuine sheets or films are available. Since these sheets have a high affinity (polyolefins) relative to each other, the milled or fibrillated agglomerate develops adhesion properties for the bonding between mixed plastics hardly melting. The bonding means component can be added as separate particles to the mixture of flakes, fibres or sole resins and milled agglomerate. A mixture prior to the agglomeration process must not be carried out by the agglomeration process again a mixed plastic is achieved with undefined properties. The properties of the wood material plates to which a portion of milled or ground one-fraction plastics is added, can be scaled steplessly. Particularly advantageous is the manufacture of relative thin wood material plates up to 8 mm thickness since a heating through the intermediate layer can be achieved in the mould so that the particles of the bonding means are molten. This, however, can be also achieved with thick panels up to 40 mm thickness. In this case a back cooling and other known process techniques must be used which allow the introduction of the required amount of heat. According to an embodiment of the invention, the added portion of milled one-fraction plastics agglomerate may be up to approximately 100% referred to the used content of milled or fibrillated mixed plastic agglomerate. Also if pure plastics or one-fraction agglomerate is added, the milling takes place to a grain size which corresponds to that of the wood flakes or wood fibres and the product of the milled mixed plastics agglomerate.

As already mentioned above, it is known to compose wood material plates of different layers. In an embodiment of the invention the wood material plate consists of at least two layers, one layer being composed of wood flakes or fibres, milled or fibrillated agglomerate of mixed plastics and a binding means and the other being composed of wood flakes or fibres, milled or fibrillated agglomerate of one-fraction plastics and a binding means, the layers being heat-compressed to a plate.

A method for the manufacture of wood material plates provides the following steps: Milling or grinding of agglomerates of mixed plastics from the waste removal and mixing the milled agglomerate with wood flakes, both products having the same range of particle size. The mixture is compressed in a heat-compressing process to a plate of predetermined thickness under supply of a binding means. The agglomerate for example can be milled in a spice mill.

A method according to the invention for the manufacture of a wood fibre plate provides the following steps: Fibrillating of agglomerates of mixed plastics from the waste removal and mixing it with wood flakes, the mixture being compressed to a plate of predetermined thickness in a heat-compression process under supply of a binding means. The disintegrating of the agglomerate and/or the wood for example can be carried out by a knife ring flaker or hogger. Alternatively, the flakes could be put into a refiner together with the agglomerates in order to fibrillate the components and mix them.

It is understood that with the manufacture of wood flakes or wood fibre plates milled agglomerate from one-fraction plastics can be added which melts at low temperature in order to achieve the desired properties of the manufactured wood material plate. Up to 150% referred to the flake or fibre content of the material of the wood material plates the properties of a wood fibre or wood flake plate are prevailing. Such plates thus can be sawed up, milled, ground or drilled. With a higher addition of mixed plastics and/or one-fraction plastics, the properties of the wood material plate approach those of a plastic plate, the latter having a certain elasticity. In particular, with the addition of milled or ground agglomerate of one-fraction plastics, the lateral tensile strength is significantly increased and the swelling in case of deposited water is drastically reduced.

The manufacture of the wood material plates according to the invention can be carried out with conventional production processes. Therefore, the pure expenses for the process are not larger than that for conventional wood material plates.

The milling or crushing of the agglomerate of one-fraction plastics having a low melting temperature preferably takes place in a cooled state preferably in cryo mills (spice mills with cryo technology). It must be avoided that during milling heat causes a fusing of the milled grains. A further usable technology is the suction during the milling process in order to prevent the grains from fusing.

After the manufacture of the individual components they have to be mixed up. The mixing can take place under addition of cold adhesive whereby a certain binding of the contents of the wood material and the milled agglomerate is generated so that the conveyance into a press assembly in particular for a dry process is facilitated. Regarding the later properties of the wood material plate, the added cold adhesive is without importance.

Hereinafter are some examples for a wood material plate according to the invention and the process technology for manufacture:

Flake Panels

First Example

A flake panel having a thickness of d=13 mm; 100% milled agglomerate of mixed plastics, referred to wood flake mass atro with a grain size<1.0 mm; content of UF-resin 4%; paraffin content 1%, also referred to wood mass atro.

Second Example:

Flake plate with a thickness of d=4 mm; 150% milled agglomerate of mixed plastics, referred to wood flake mass atro with a grain size<1.0 mm; content of UF-resin 4%; paraffin content 1% each referred to wood mass atro.

Fibre Plate

First Example

Fibre plate with a thickness of d=13 mm; 100% milled agglomerate of mixed plastics, referred to wood fibre mass atro with a grain size<1,0 mm; content of UF-resin 4%; paraffin content 1%, each referred to wood mass atro.

Second Example:

Fibre plate with a thickness of d=4 mm; 150% milled agglomerate of mixed plastics, referred to fibre mass atro with a grain size<1,0 mm; content of UF-resin 4%; paraffin content 1%, each referred to wood mass atro.

Third Example:

Flake plate with a thickness of d=13 mm; cover layer 100% milled agglomerate of mixed plastics, referred to wood flake mass atro with a grain size<1,0 mm. For the intermediate or the other layer, respectively, 100% milled agglomerate of sheet plastics referred to wood flake mass atro with a grain size<2,0 mm. Content of UF-resin 4% and of paraffin 1% each referred to wood mass atro.

Fourth Example:

Flake plate with a thickness of d=4 mm; 150% milled agglomerate of mixed plastics, referred to wood flake mass atro with a grain size<1,0 mm and milled agglomerate of sheets with a grain size<2,0 mm; proportion of the milled agglomerate portions 1:1; content of UF-resin 4% and of paraffin 1%, each referred to wood mass atro.

Process Technology

First Example:

Compressing of the mixtured mass in a multi-daylight press, compression temperature approximately 240° C. compression time factor 15 s/mm, panel thickness 13 mm, initial pressure 6 bar, maintaining the pressure 80 seconds, pressure decrease to 3.5 bar, maintaining the pressure approximately 40 seconds, further decrease of pressure to 1.5 bar and maintaining the pressure 70 seconds, then complete pressure decrease.

Second Example:

Compression in a multi-daylight press, temperature of the compression surfaces approximately 240° C. with a compression time factor 13 s/mm, panel thickness 13 mm, initial pressure 6 bar, increasing to 7.5 bar, holding the pressure about 80 seconds, pressure decrease to 3.5 bar, holding the pressure approximately 40 seconds, further decrease of pressure to 1.5 bar, holding the pressure about 70 seconds, thereafter complete pressure decrease.

The mixed plastics preferably is milled in one step and thereafter sieved. The sheet plastics i.e. one-fraction plastics is preferably milled in 2 or 3 steps and thereafter sieved, preferably the cooling of the agglomerate is below 0° C.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A plate of wood material, wherein wood fibres or wood chips or flakes and synthetic particles or fibres, respectively, are compressed to a panel by a heat compression process, a portion of the wood chips or fibres are substituted by a milled or fibrillated agglomerate of mixed synthetics of waste material from waste removal which are added to the wood chips or wood fibres prior to compression, and a particle size of wood chips or flakes or fibres and a particle size of the milled agglomerate is approximately equal.

2. The plate of claim 1, wherein the contents of milled or fibrillated agglomerate is up to 150% referred to the mass of wood chips or flakes or wood fibres atro.

3. The plate of claim 1, wherein the contents of milled or fibrillated agglomerate is above 150% referred to the mass of wood chips or flakes or fibres atro.

4. The plate of claim 1, wherein the particle size is 0.05 to 2.0 mm.

5. The plate of claim 4, wherein the particle size is smaller than 1.0 mm.

6. The plate of claim 1, wherein the content of milled agglomerate of a low melting pure plastic fraction from collection systems of waste removal is added.

7. The plate of claim 6, wherein the content of added milled pure fraction plastic agglomerate is up to approx. 100% referred to the contents of milled or fibrillated agglomerate of mixed plastics.

8. The plate of claim 6, wherein the agglomerate of pure fraction plastics is essentially of remains of synthetic sheets or films.

9. The plate of claim 1, wherein it consists of at least 2 layers, a first layer being composed of wood flakes or fibres, milled or fibrillated agglomerate of mixed plastics and a binding means and the second being composed of wood flakes or fibres, milled or fibrillated agglomerate of pure fraction plastics and binding means, the layers being heat-compressed to a plate.

10. A wood flake or wood fibre plate, the wood flake or wood fibre plate comprising wood chips or wood fibres and a milled or fibrillated agglomerate of mixed plastics from waste removal, wherein a particle size of wood chips or wood fibers-and a particle size of the milled agglomerate are approximately equal.

* * * * *